United States Patent Office 3,065,251
Patented Nov. 20, 1962

3,065,251
SUBSTITUTED PHENAZASILINES
Robert E. Jones, Rahway, and David Wasserman, Springfield, N.J., assignors to Merck & Co., Inc., Rahway, N.J., a corporation of New Jersey
No Drawing. Filed Aug. 31, 1959, Ser. No. 836,928
13 Claims. (Cl. 260—448.2)

This invention relates to antioxidants for high temperature lubricants and more particularly to a new process for making derivatives of phenazasiline.

The compound 5-ethyl-10,10-diphenylphenazasiline has been found to be useful as an antioxidant in high temperature lubricants, particularly those of the synthetic ester type. However, the lack of any method suitable for making this compound in large quantities has retarded the use of this compound and the development of high temperature synthetic lubricants which are capable of withstanding temperatures in the range of 400° F. and higher. The method disclosed by Gilman et al. in Chemistry and Industry, Sept. 20, 1958, page 1227, which is probably the best method known prior to the present invention, suffers from the disadvantage of low overall yield and the necessity of use as an intermediate the difficultly obtainable 2,2'-dibromo-N-ethyldiphenylamine.

An object of the present invention is to provide an improved synthesis for phenazasiline derivatives such as 5-ethyl-10,10-diphenylphenazasiline.

Another object of this invention is to prepare novel compounds which are useful as intermediates in the formation of 5-ethyl-10,10-diphenylphenazasiline and other phenazasiline derivatives.

These and other objects will appear more fully in the disclosure which follows.

According to the present invention there is provided a new and improved process for making phenazasiline derivatives having the general formula

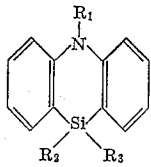

where $R_1$ is a lower alkyl radical and $R_2$ and $R_3$ are radicals selected from the compound consisting of lower alkyl and phenyl. These compounds are antioxidants useful in high temperature lubricants, particularly low molecular weight esters of polyhydroxy alcohols. The addition a phenazasiline derivative to such esters is necessary in order to prevent oxidation and thereby impart thermal stability up to temperatures of 400° F. and higher.

Novel intermediates having the general formula

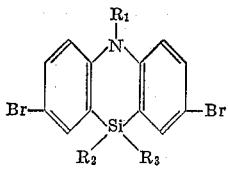

where $R_1$, $R_2$ and $R_3$ are as previously defined, are formed according to this invention. Other novel intermediates of this invention are 2,2',4,4'-tetrabromo-N-ethyldiphenylamine and compounds having the formula

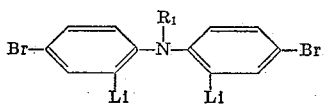

where $R_1$ is as previously defined.

The following flow sheet illustrates the novel process of this invention:

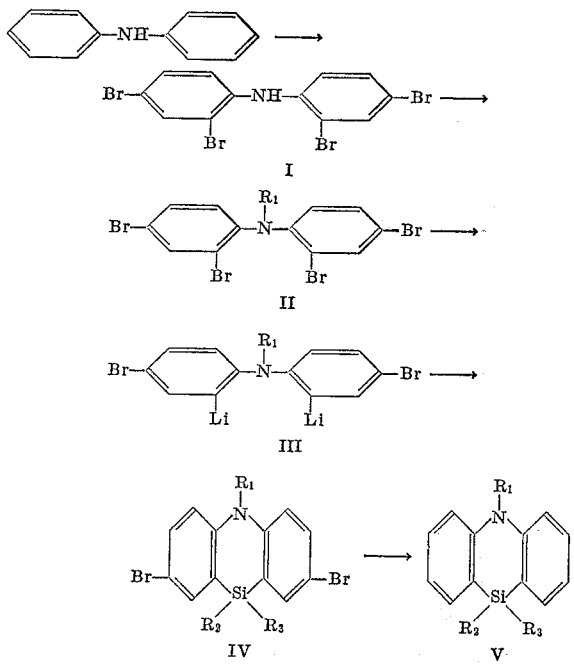

Diphenylamine is brominated with either bromine or with a brominating agent such as N-bromoacetamide or N-bromosuccinimide or other reagent having a positive bromine atom, thereby forming 2,2',4,4'-tetrabromodiphenylamine (I). This compound is then alkylated to form 2,2',4,4'-tetrabromo-N-(lower alkyl) diphenylamine (II). Examples of the compounds thus formed are 2,2',4,4-tetrabromo-N-methyldiphenylamine and 2,2',4,4'-tetrabromo-N-ethyldiphenylamine. The N-propyl and N-butyl homologs can be similarly prepared. A preferred method of making these compounds is to react 2,2',4,4'-tetrabromodiphenylamine with methyl lithium followed by a dialkyl sulfate such as dimethyl sulfate. For instance, 2,2',4,4'-tetrabromo-N-ethyldiphenylamine can be prepared by reacting diphenylamine with about four moles of bromine, and reacting the resulting 2,2',4,4'-tetrabromodiphenylamine successively with methyl lithium and diethyl sulfate, thereby forming 2,2',4,4'-tetrabromo-N-ethyldiphenylamine. Alternatively compounds II can be formed by direct alkylation with a lower alkyl bromide such as methyl bromide or ethyl bromide.

The 2,2',4,4'-tetrabromo - N - (lower alkyl) - diphenylamine (II) is reacted with about two moles of a straight chain lower alkyl lithium containing from 2 to 10 carbon atoms, such as butyl lithium, ethyl lithium, propyl lithium, pentyl lithium, hexyl lithium, decyl lithium and the like, at a temperature not over about 10° C. and preferably about 0° C., in order to form a 4,4'-dibromo-2,2'-dilithio-N-(lower alkyl)diphenylamine (III). Surprisingly, under these conditions there is a highly selective replacement of the bromine atoms at the 2 and 2' positions with lithium, while the 4 and 4' bromine atoms are not attacked. Specific compounds which can be formed according to this reaction include 4,4'-dibromo-N-ethyl-2,2'-dilithio-diphenylamine and 4,4'-dibromo-2,2'-dilithio-N-methyl-diphenylamine. This reaction is carried out in an anhydrous organic solvent such as tetrahydrofuran. An inert atmosphere such as nitrogen or argon surrounds the reaction medium. It is essential to exclude both oxygen and water from the reaction in view of the reactivity of the alkyl lithium.

The 4,4'-dibromo-2,2'-dilithio-N-(lower alkyl) diphenylamine (III) is reacted with a compound having the formula

where $R_2$ and $R_3$ are radicals selected from the group consisting of lower alkyl and phenyl and X is a halogen having an atomic weight in the range of 35 to 80. The radicals $R_2$ and $R_3$ may be either identical or unlike. The product of this reaction is a 2,8-dibromo-5,10,10-trihydrocarbon-substituted phenazasiline (IV). A specific illustration of this step is the reaction of 4,4'-dibromo-N-ethyl-2,2'-dilithio-diphenylamine with diphenyldichlorosilane to form 2,8-dibromo-5-ethyl-10,10-diphenylphenazasiline. Further illustrations of this step are the reaction of 4,4'-dibromo-2,2'-dilithio - N - methyldiphenylamine with diphenyldichlorosilane to form 2,8-dibromo-5-methyl-10,10-diphenylphenazasiline, and the reaction of 4,4'-dibromo-N-ethyl - 2,2' - dilithiodiphenylamine with either dimethyldichlorosilane or methylphenyldichlorosilane to form 2,8-dibromo-5-ethyl-10,10-dimethylphenazasiline and 2,8-dibromo-5-ethyl-10-methyl - 10 - phenylphenazasiline, respectively. This reaction is preferably conducted at low temperature, for instance about 0° C., in an anhydrous organic solvent such as ether.

The final step in the reaction is the hydrogenation of IV in order to form the desired end product which is a phenazasiline derivative having the Formula V. This may be carried out by reacting IV with hydrogen at superatmospheric pressure (for example about 30 or 40 p.s.i.g.) in the presence of a catalyst such as palladium on charcoal. By way of illustration 2,8-dibromo-5-ethyl-10,10-diphenylphenazasiline is converted to 5-ethyl-10,10-diphenylphenazasiline, 2,8-dibromo-5-methyl-10,10 - diphenylphenazasiline to 5-methyl-10,10-diphenylphenazasiline, 2,8 - dibromo-5-ethyl-10,10-dimethylphenazasiline to 5-ethyl-10,10-dimethylphenazasiline, and 2,8-dibromo-5-ethyl-10-methyl-10 - phenylphenazasiline to 5 - ethyl-10-methyl-10-phenylphenazasiline.

This invention will be illustrated in detail with respect to the specific examples which follow:

EXAMPLE 1

2,2',4,4'-Tetrabromodiphenylamine

A solution of 42.3 g. (0.25 mole) of diphenylamine in 300 cc. of chloroform was placed in a 1-liter, 3-neck flask equipped with stirrer, thermometer well, condenser, addition funnel, and gas trap. A solution of 159.8 g. (1 mole) of bromine in 140 cc. of glacial acetic acid was added dropwise at the rate of 4 drops per second at room temperature until about 35 cc. had been added. The heat of reaction raised the temperature to 60° C. in 5 minutes. After the initial formation of a solid the solution again became clear, and then a voluminous precipitation was formed. The remainder of the solution of bromine in acetic acid was added while the reaction temperature was maintained at 50–60° C. Water was then added, and the reaction mixture was stirred 15 minutes and filtered at 35° C. through a fritted glass Buchner funnel. The filtrate was cooled to 0° C., yielding a second crop of crystals. The combined yield was 115.5 g. (95.5%). Recrystallization from toluene at 0° C. yielded 110.5 g. (91.5%) of pure 2,2',4,4'-tetrabromodiphenylamine, M.P. 188.5–189.5° C.

EXAMPLE 2

2,2',4,4'-Tetrabromo-N-Ethyldiphenylamine

Methyl lithium for use in this example was prepared as follows: Into a 1-liter, 3-neck flask equipped with stirrer, addition funnel, addition tube, condenser and nitrogen inlet tube was placed 10 cc. (about 0.418 g.) of lithium wire in 150 cc. of sodium-dried diethyl ether. The flask was purged with nitrogen and a slow stream of this gas was bubbled through the solvent. About 80 drops of solution consisting of 70.9 g. (0.5 mole) of methyl iodide in 150 cc. of sodium-dried diethyl ether was added to the lithium. The solution became hazy, indicating initiation of the reaction. The rest of the solution of methyl iodide in diethyl ether was added in 90 minutes at a rate sufficient to maintain gentle reflux of the reaction solvent without external cooling. When the addition of methyl iodide was complete, the flask was heated at reflux temperature for 45 minutes. The solution was cooled and filtered through a glass wool plug into a 1-liter flask previously purged of air with dry nitrogen. The flask and filter were washed with 150 cc. of diethyl ether. The flask containing the filtrate was rubber stoppered and secured with a wire strap and allowed to stand overnight at 0° C. A 5 cc. aliquot of the clear supernatant solution was titrated with 1.004 N sulfuric acid. Titration indicated that the concentration of methyl lithium was 0.896 N.

A suspension of 48.5 g. (0.1 mole) of 2,2',4,4'-tetrabromodiphenylamine in 250 g. of dry tetrahydrofuran was placed in a 500 cc. 3-neck flask equipped with stirrer, addition tube, nitrogen inlet tube, addition funnel, and condenser, which had been purged with nitrogen gas. About 116 cc. of the solution of methyl lithium in ether made as described in the preceding paragraph (containing 0.104 mole of methyl lithium) was added dropwise at 20 to 24° C. using external cooling. Evolution of methane gas indicated reaction of the methyl lithium. The reaction mixture was distilled to an overhead boiling point of 65° C. removing the ether and about 221 g. of tetrahydrofuran. A solution of 15.4 g. (0.1 mole) of diethyl sulfate in 20 g. of dry tetrahydrofuran, plus an additional 125 cc. of dry tetrahydrofuran, was added. After refluxing for 20 hours most of the solvent was recovered by vacuum distillation. To the reaction mass was added 250 cc. of water, and the mixture was heated for 30 minutes at 95° C. to destroy the excess diethyl sulfate. About 225 cc. of toluene was added to the aqueous portion of the product and heated with stirring. The aqueous layer was separated. The remainder of the water was removed from the toluene solution by azeotropic distillation using a Dean-Stark water trap. The deposited salts were removed by filtration and washed with 25 cc. of toluene. The combined filtrates were cooled to 4° C. for 3 hours and the solid filtered. The solid weighed 20 g. and melted at 129–134° C. The mother liquor was evaporated to yield 28 g. of solid, which was recrystallized from 150 g. of butanol to yield 25.5 g. of product melting at 126–134° C. The product was recrystallized 3 times from dimethylformamide to yield 20.1 g. (39%): M.P. 136.5–138.5° C.; $\lambda_{max}$. 2950, E% 296.

*Analysis.*—Br, Calculated: 62.30%. Found: 62.41%.

The compound 2,2',4,4'-tetrabromo-N-methyl-diphenylamine can be prepared according to the procedure of Example 2 substituting an equivalent quantity of dimethyl sulfate for diethyl sulfate.

EXAMPLE 3

2,8-Dibromo-5-Ethyl-10,10-Diphenylphenazasiline

The n-butyl lithium used in this example was prepared as follows: To 12.9 g. (1.875 moles) of lithium in 300 cc. of dry diethyl ether in a 1-liter flask purged with dry nitrogen was added 90 drops of a solution made by dissolving 102.8 g. (0.75 mole) of n-butyl bromide in 150 cc. of dry diethyl ether. After appearance of a haze in the reaction mixture, the temperature was reduced to −5 to −10° C. using an acetone-Dry Ice bath. The remainder of the butyl bromide was added in 45 minutes at this temperature. After stirring at 0–15° C. for 1 hour and 40 minutes, the unreacted lithium wire was removed by filtration through a glass wool plug under nitrogen. The reaction flask and glass wool plug were washed with 150 cc. dry diethyl ether. A 5 cc. aliquot was titrated with 1.004 N sulfuric acid requiring 7.52 cc. Another 5 cc. adiquot was reacted with 1 cc. of benzyl chloride, and titrated with 1.15 cc. of sulfuric acid. The difference in acid (6.37 cc.) is equivalent to the n-butyl lithium. The n-butyl lithium solution was calculated to be 1.28 N.

A solution of 10.26 g. (0.02 mole) of 2,2′,4,4′-tetrabromo-N-ethyldiphenylamine in 75 cc. of sodium-dried diethyl ether in a 500 cc. flask in a dry nitrogen atmosphere was heated to reflux to partially dissolve the solid. The suspension was cooled to 0° C. and 31.2 cc. of the n-butyl lithium (containing 0.04 mole of n-butyl lithium) as prepared in the preceding paragraph was added dropwise through a dropping funnel in 20 minutes, and the solution was allowed to stand for an additional 70 minutes at 0° C. The suspended material slowly went into solution as 4,4′-dibromo-N-ethyl-2,2′-dilithiodiphenylamine. At the end of the 70 minutes a solution of 5.07 g. (0.02 mole) of diphenyldichlorosilane in 20 g. of ether was added dropwise. Lithium chloride deposited slowly from the hazy pink solution. The temperature was raised to 22° C. in 15 minutes and maintained there for 3 hours. A color test with Michler's ketone plus iodine in acetic acid was negative indicating absence of aryl or aliphatic lithium compounds and complete utilization of the 4,4′-dibromo - N - ethyl - 2,2′ - dilithiodiphenylamine. The reaction mixture was neutralized with 0.0055 mole of acid, and 50 cc. of water was added. The aqueous layer was separated and the ether layer washed with 50 cc. of water. After separation of the second aqueous layer a white product started to precipitate on the walls of the funnel. About 4.2 g. of product melting at 204–205° C. was collected. The remaining ether solution was transferred to a round bottom flask and taken to dryness by vacuum distillation, yielding 12.0 g. of a brown solid melting at 147–195° C. On recrystallization from n-butanol there was obtained 4.8 g. of white crystals melting at 200–205° C. The total yield was 9.0 g. (84%) of material melting above 200° C. Recrystallization from acetone yielded rhombic crystals of pure 2,8-dibromo-5-ethyl-10,10-diphenylphenazasiline; M.P. 206.5–207.5° C.; $\lambda_{max}$ 3370, 3120, 2950, 2680, 2510, 2230; E% 92, 186, 338, 119, 114, 780, respectively. (This ultraviolet absorption curve was similar to that of 5-ethyl-10,10-diphenylphenazasiline.)

*Analysis.*—Br, Calculated: 29.87%. Found: 29.47%. Upon mixing with dibrominated 5-ethyl-10,10-diphenylphenazasiline there was no depression of melting points.

EXAMPLE 4

*2,8-Dibromo-5-Methyl-10,10-Diphenylphenazasiline*

The starting material 2,2′,4,4′-tetrabromo-N-methyldiphenylamine used in this example was prepared as follows: A solution of 25.5 g. (0.15 mole) of diphenylamine in 225 cc. of acetone was heated to boiling. To this solution was added 14.1 cc. of dimethyl sulfate and 8.45 g. of powdered potassium hydroxide. This solution was gently refluxed for 10 minutes, and 2 portions of 2.8 cc. of dimethyl sulfate and 1.68 g. of potassium hydroxide was added after 5 and 10 minutes of reflux respectively. The solution was then refluxed for an additional 10 minutes and quenched with 400 cc. of water. The quenched mixture was extracted with two 75 cc. portions of benzene, and the benzene solution was washed twice with 30 cc. of water and dried over magnesium sulfate. After removal of the solvent the crude oil weighing 34.8 g. was purified by distillation and freed of unreacted diphenylamine by extraction with concentrated hydrochloric acid. The purified N-methyldiphenylamine was obtained as an oil having the following characteristics: 108–113° C. at 0.8 mm.; $n_d^{25}$ 1.6136; sp. gr. 1.04; $\lambda_{max}$ 2920 A., E% 621, $\lambda_{max}$ 2430 A., E% 503.

*Analysis.*—Calculated for $C_{13}H_{13}N$: C, 85.1%; H, 7.15%. Found: C, 85.4%; H, 7.08%.

Fifty grams of N-methyldiphenylamine (0.273 mole) was dissolved in 1100 cc. of a 50% (volume basis) mixture of carbon tetrachloride and chloroform and charged into a 2-liter flask. A solution of 200 g. of N-bromosuccinimide (1.125 moles) was added in portions with agitation at room temperature. A portion of N-bromosuccinimide was added only after the previous portion had been consumed and shown by a negative starch-iodide test. The addition was carried out over 21 hours. After the addition was completed, 250 cc. of water was added to dissolve the succinimide. The layers were separated and the organic layer was washed with water. The solvent layer was dried over magnesium sulfate and the solvent removed. Yield 126 g., M.P. 143–146° C. Recrystallization of a 1 g. sample from 5 cc. of hot "Skellysolve C" (essentially n-heptane, boiling range 85–100° C.) afforded 0.9 g. of pure 2,2′,4,4′-tetrabromo-N-methyldiphenylamine; M.P. 142–144° C.; $\lambda_{max}$ 2910 A., E% 299.

*Analysis.*—Calculated for $C_{13}H_9Br_4N$: C, 31.3%; H, 1.82%; Br, 64.2%. Found: C, 31.6%; H, 1.66%; Br, 64.3%.

Butyl lithium for use in this example was prepared and titrated as described in Example 3.

To a solution of 37.4 g. (0.075 mole) of 2,2′,4,4′-tetrabromo-N-methyldiphenylamine in 300 cc. of ether was added 0.15 mole of butyl lithium in 175 cc. of ether. To this solution was added 18.9 g. of dichlorodiphenylsilane in 90 ml. of ether. The addition required about 30 minutes and was carried out at −5 to 0° C. The solution was aged for 21 hours, and a test for organic lithium compounds was negative. To this reaction mixture was added 100 ml. of water. The layers were separated and the ether layer was washed with water and dried over sodium sulfate. Solid 2,8-dibromo-5-methyl-10,10-diphenylphenazasiline was recovered on removal of the solvent. The crude solid was slurried in 100 cc. of cold ethanol and recovered in purified form on evaporation of the solvent; yield 30.6 g. (74%). After further purification by ether slurry and recrystallization from n-butanol, a product having the following physical constants was obtained: M.P. 200–202° C.; $\lambda_{max}$ 2210 (shoulder), 2930, 3360, and 3430 A. (shoulder), E% 808, 417, 102 and 96.1 respectively.

*Analysis.*—Calculated for $C_{15}H_{19}Br_2NSi$: Br, 30.7%. Found: Br, 30.7%.

EXAMPLE 5

*2,8-Dibromo-5-Ethyl-10,10-Dimethylphenazasiline*

To a slurry of 25.6 g. (0.05 mole) of 2,2′,4,4′-tetrabromo-N-ethyldiphenylamine in 175 cc. of dry ether was added 6.4 g. (0.10 mole) of butyl lithium prepared as described in Example 3. To the resulting intermediate was added 6.4 g. (0.05 mole) of dimethyldichlorosilane, and the mixture was aged 20 hours. The addition of dimethyldichlorosilane was carried out at −5 to 0° C. over a period of about 30 minutes. Water was added to the aged reaction mixture, the layers separated, and the ether layer washed with water, and dried over sodium sulfate. Removal of the ether precipitated a greenish solid crude product; yield 19.0 g. (92%). Recrystallization from isopropyl alcohol yielded pure 5-ethyl-10,10-dimethylphenazasiline; M.P. 132.5–134° C.; $\lambda_{max}$ 2510, 2640, 2950, 3090, 3320, and 3440 A., E% 134, 141, 518, 313, 117, and 78 respectively.

*Analysis.*—Calculated for $C_{15}H_{17}Br_2NSi$: Br, 38.9%. Found: Br, 38.9%.

EXAMPLE 6

*5-Ethyl-10,10-Diphenylphenazasiline*

A hydrogenation bottle was loaded with 535 mg. (0.001 mole) of pure 2,8-dibromo-5-ethyl-10,10-diphenylphenazasiline in 3 cc. of benzene. To this was added 250 mg. of 5% palladium on charcoal and 500 mg. of sodium acetate. Hydrogenation was carried out at 25° C. for 4 hours at 35 to 40 p.s.i.g. hydrogen pressure. The charge was filtered and the catalyst cake washed with benzene. The combined benzene filtrates were washed twice with water and dried with anhydrous sodium sulfate. The combined filtrates were taken to dryness. The crude product weighed 377 mg. and melted at 115–125° C. The Beilstein test for halogen was negative. Recrystallization of 353 mg. of crude product from ethanol yielded 310 mg. (88%) of pure 5-ethyl-10,10-diphenylphenazasiline; M.P. 122–124° C. A mixed melting point with authentic 5-ethyl-10,10-diphenylphenazasiline showed no depression of the melting point.

EXAMPLE 7

*5-Methyl-10,10-Diphenylphenazasiline*

A solution of 1.3 g. (0.0025 mole) of 2,8-dibromo-5-methyl-10,10-diphenylphenazasiline in 10 cc. of benzene and 10 cc. ethanol was prepared. To this solution was added 0.612 g. (0.00625 mole) of potassium acetate and 0.1 g. of 5% palladium on charcoal. This mixture was charged to a hydrogenation bottle and the solution was shaken under 40 p.s.i.g. of hydrogen pressure for 72 hours. Additional catalyst and potassium acetate were added and further hydrogen was supplied until the uptake stopped. The mixture was filtered, the cake washed with benzene, and the combined filtrate washed with water to remove inorganic substances. After removal of the solvent, a crude product weighing 1.08 g. was obtained. Recrystallization from ethyl acetate yielded a product having a negative Beilstein test for halogen. Further purification from "Skellysolve B" afforded pure 5-methyl-10,10-diphenylphenazasiline.

EXAMPLE 8

*5-Methyl-10,10-Dimethylphenazasiline*

To a solution of 2.05 g. (0.005 mole) of 2,8-dibromo-5-ethyl-10,10-dimethylphenazasiline in 20 cc. of benzene was added 1.4 g. (0.015 mole) of potassium acetate in 25 cc. of ethanol. To the resulting solution was added 0.75 g. of 5% palladium on charcoal catalyst. The mixture was shaken under 40 p.s.i.g. of hydrogen, and the theoretical amount was absorbed in 30 minutes. The catalyst was removed by filtration. The filtrate was extracted with water to remove inorganic substances. The organic layer, mostly benzene, was dried over sodium sulfate, and the solvent removed. A waxy solid was obtained; yield 1.20 g. (95%); M.P. 63–65° C. This material was purified by distillation in a molecular still, yielding pure 5-ethyl-10,10-dimethylphenazasiline. Yield 0.86 g.; M.P. 66.2–67.4° C.; $\lambda_{max}$. 2180, 2850, 3210, and 3300 A., E% 794, 623, 191, and 134 respectively. A Beilstein test for halogen was negative.

While this invention has been described in detail with respect to specific embodiments, it is understood that the scope of this invention is limited only by the scope of the appended claims.

What is claimed is:

1. A process for preparing a compound of the formula

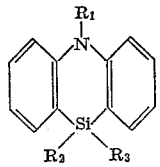

where $R_1$ is lower alkyl and $R_2$ and $R_3$ are selected from the group consisting of lower alkyl and phenyl, which comprises intimately mixing a compound having the formula

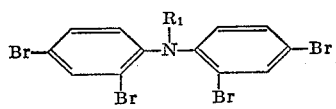

with a straight chain lower alkyl lithium containing from 2 to 10 carbon atoms in an anhydrous organic solvent in the presence of an inert atmosphere at a temperature not exceeding about 10° C., reacting the resulting 4,4'-dibromo-N-(lower alkyl)-2,2'-dilithiodiphenylamine with a reagent having the formula

where X is a halogen selected from the group consisting of chlorine and bromine thereby forming a compound having the formula

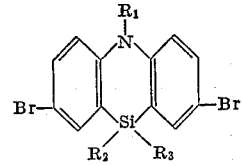

and intimately contacting said compound with hydrogen in the presence of a hydrogenation catalyst to form a compound having the formula

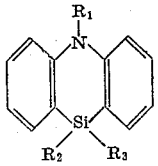

2. A process for preparing 5-ethyl-10,10-diphenylphenazasiline which comprises intimately mixing 2,2',4,4'-tetrabromo-N-ethyldiphenylamine with a straight chain lower alkyl lithium containing from 2 to 10 carbon atoms in an anhydrous organic solvent in the presence of an inert atmosphere at a temperature not exceeding about 10° C., intimately mixing the resulting 4,4'-dibromo-N-ethyl-2,2'-dilithiodiphenylamine with diphenyldichlorosilane in an anhydrous organic solvent in the presence of an inert atmosphere, thereby forming 2,8-dibromo-5-ethyl-10,10-diphenylphenazasiline, and contacting said compound with hydrogen in the presence of a palladium catalyst to form 5-ethyl-10,10-diphenylphenazasiline.

3. A process which comprises intimately mixing a compound of the formula

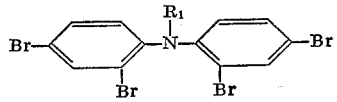

where $R_1$ is lower alkyl, with a straight chain lower alkyl lithium containing from 2 to 10 carbon atoms in an anhydrous organic solvent in the presence of an inert atmosphere at a temperature not exceeding about 10° C., and reacting the resulting 4,4'-dibromo-2,2'-dilithio-N-(lower alkyl)diphenylamine with a reagent having the formula

where $R_2$ and $R_3$ are selected from the group consisting of lower alkyl and phenyl and X is a halogen selected from the group consisting of chlorine and bromine, in an anhydrous organic solvent in the presence of an inert atmosphere, thereby forming a compound having the formula

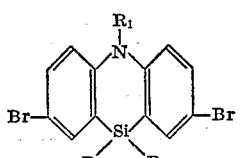

4. A process which comprises intimately mixing 2,2',4,4'-tetrabromo-N-ethyldiphenylamine with a straight chain lower alkyl lithium containing from 2 to 10 carbon atoms in an anhydrous organic solvent in the presence of an insert atmosphere at a temperature not exceeding about 10° C., and reacting the resulting 4,4'-dibromo-N-ethyl-2,2'-dilithiodiphenylamine with diphenyldichlorosilane in an anhydrous organic solvent in the presence of an inert atmosphere, thereby forming 2,8-dibromo-5-ethyl-10,10-diphenylphenazasiline.

5. A process which comprises intimately mixing a compound of the formula

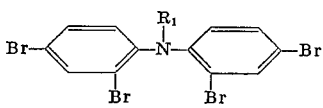

where $R_1$ is lower alkyl with a straight chain lower alkyl lithium containing from 2 to 10 carbon atoms in an anhydrous organic solvent in the presence of an inert atmosphere at a temperature not exceeding about 10° C., thereby forming a 4,4'-dibromo-2,2'-dilithio-N-(lower alkyl)-diphenylamine.

6. The process of claim 5 wherein the anhydrous organic solvent is diethyl ether.

7. The process of claim 5 wherein the lower alkyl lithium is n-butyllithium.

8. A process which comprises intimately mixing a compound of the formula

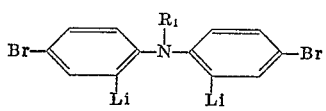

where $R_1$ is lower alkyl, with a reagent having the formula

where $R_2$ and $R_3$ are selected from the group consisting of lower alkyl and phenyl and X is a halogen selected from the group consisting of chlorine and bromine, in an anhydrous organic solvent in the presence of an inert atmosphere, thereby forming a compound having the formula

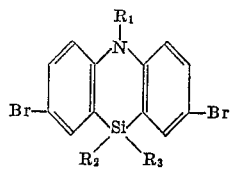

9. A process which comprises intimately mixing 4,4'-dibromo-N-ethyl-2,2'-dilithiodiphenylamine with diphenyldichlorosilane in an anhydrous organic solvent in the presence of an inert atmosphere, thereby forming 2,8-dibromo-5-ethyl-10,10-diphenylphenazasiline.

10. 4,4'-dibromo-N-ethyl-2,2'-dilithiodiphenylamine.

11 A compound of the formula

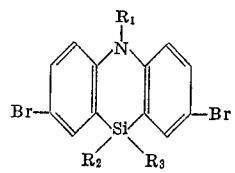

where $R_1$ is lower alkyl and $R_2$ and $R_3$ are selected from the group consisting of lower alkyl and penhyl 12. 2,8-dibromo-5-ethyl-10,10-diphenylphenazasiline.

13. 2,8-dibromo-5-methyl-10,10-diphenylphenazasiline.

References Cited in the file of this patent

UNITED STATES PATENTS

| | | |
|---|---|---|
| 2,171,159 | McNally et al. | Aug. 29, 1939 |
| 2,534,237 | Cusic | Dec. 19, 1950 |
| 2,889,328 | Sherlock et al. | June 2, 1959 |

OTHER REFERENCES

Richter: Organic Chem., vol. 4, p. 5 (1947).

Royals: Advanced Organic Chemistry (1956), pages 100–101.

Gilman et al.: J. Am. Chem. Soc., vol. 79, pp. 6339–40 (1957).

Gilman et al.: Chemistry and Industry (1958, page 1227).

Hitchcock et al.: J. Chem. Soc., 1957, pp. 4537–4546.